Nov. 13, 1951  F. S. THOMAS, JR  2,574,602
ENGINE SUSPENSION
Filed Oct. 25, 1946

INVENTOR.
FRANK S. THOMAS JR.

BY *Fay Golrick & Fay*

ATTORNEYS

Patented Nov. 13, 1951

2,574,602

UNITED STATES PATENT OFFICE 2,574,602

ENGINE SUSPENSION

Frank Stevens Thomas, Jr., Murfreesboro, Tenn., assignor to Development Corporation, Inc., St. Louis, Mo., a corporation of Missouri Application October 25, 1946, Serial No. 705,510

7 Claims. (Cl. 180—33)

1

This invention relates to power bicycles and is especially directed to a novel means for suspending an engine to a bicycle frame. At the present time most auxiliary power units for application to conventional bicycles require either a special frame, or that the existing frame be altered in some manner, as by drilling holes and attaching fixtures, brackets, etc., for the purpose of fastening the power unit thereto. Furthermore, since most of these power units are designed for installation within the frame itself they are not suitable for girls' bicycles. Irrespective of the type of frame to which they are applied, they have the additional disadvantage of raising the center of gravity of the bicycle substantially above its normal at or below the wheel centers.

It is a primary object of this invention to provide an auxiliary power unit suspension that may easily be installed without modifying the bicycle frame in any way. This is done by removing the pedal-sprocket assembly and using the pedal-sprocket housing thus vacated as the point of suspension for the engine. In this way the engine is kept below the frame where its center of gravity falls below the plane of the axes of the wheels, lending a desirable quality to the balance and riding characteristics of the bicycle. As so positioned, the engine does not take up any space in the frame, rendering it equally well adapted to girls' bicycles as well as to boys' bicycles, and special fixtures, fittings, brackets, etc., are entirely eliminated.

Related advantages are that vibrations are dampened and the effective width of the bicycle which the rider must straddle is not increased over the ordinary pedal type of propulsion means.

These and other objects and advantages will become apparent when the following specification is read in conjunction with the accompanying drawings, in which—

Referring more particularly to the drawings

Figure 1:
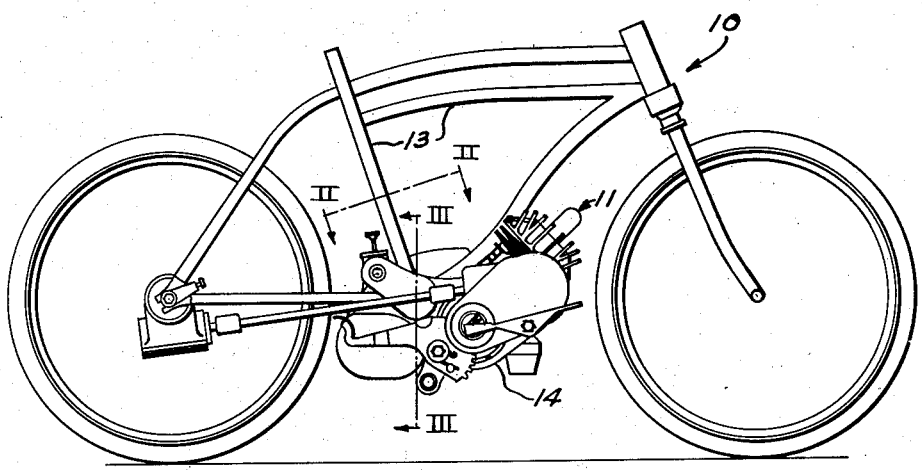
Fig. 1 is a side elevational view of the bicycle built in accordance with the preferred form of this invention.

2 in which like reference characters refer to like parts throughout, the bicycle, indicated generally by the numeral 10, is provided with a power unit 11 which is suspended from the pedal-sprocket housing 12 of the bicycle frame 13.

The power unit and drive here shown, but not claimed, is the subject of a separate application Serial No. 705,509, filed by me of even date herewith under the title "Power Transmission Device" and now Patent No. 2,487,002. There is also presently copending application Serial No. 24,239, filed April 30, 1948, now Patent No. 2,538,175, which concerns an engine mount for a bicycle.

Figure 3:
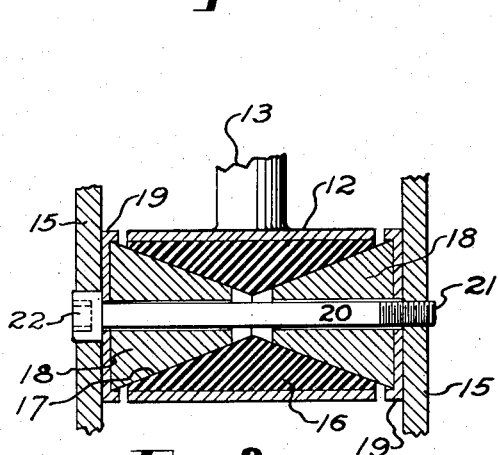
Figs. 3 and 3a are sections taken along line III—III of Fig. 1 showing preferred forms of mounting in accordance with the present invention.

As described in my other application, the power unit has a crank-case housing 14 provided with bifurcations 15 which comprise extensions of the crank-case housing which are adapted to straddle the pedal-sprocket housing 12 of the bicycle. This latter is provided, as shown in Fig. 3, with a bushing 16 which has a central bore 17 which is tapered so that its smallest dimension is at its center and which flares outwardly to each side to provide frustoconical surfaces within which plugs 18 of complementary form are disposed. Washers or caps 19 are fitted to each side of the bearing and a pin 20, provided with threading 21 and a head 22, is arranged to extend between the bifurcations 15 of the engine in such a manner that it may draw the caps 19 together to force the plugs 18 inwardly to cause the bushing 16 to expand rigidly to anchor the engine to the frame.

If the bushing 16 is of metal or other rigid material, it is made in segments to permit the expanding movement, but as a vibration dampener and a sound deadener this bushing is preferably of an elastic material, preferably of a kind which will not decompose if exposed to oil and which may, upon compression, as well as by the cam action of the conical surfaces, expand to join the several parts securely and in a cushioned manner.

Figure 3A:
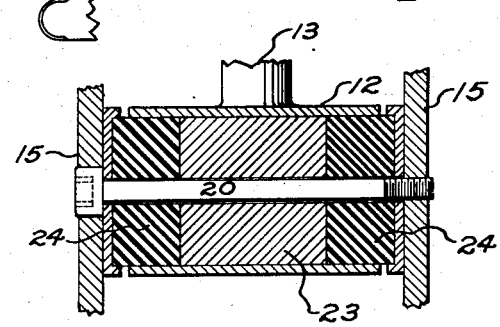

In Fig. 3A there is shown a modified form of construction embodying a core piece 23 which may be of metal, wood or other suitable material, and compressible bushings 24 which, when compressed by tightening the bolt or pin 20, expand to form a tight fit within the pedal-sprocket housing 12.

As illustrated, one of the engine housing bifurcations 15 is provided with a threaded hole for cooperation with the threaded end 21 of the bolt or pin 20, while the opposite bifurcation is provided with a smooth, aligned hole for cooperation with the head of the bolt or pin 20 to afford a gudgeon for supporting the adjacent engine bifurcation. It will be understood, however, that any suitable arrangement in this respect is contemplated and a nut may be provided for cooperation with the threaded end of the pin 20 instead of the threaded hole in the bifurcation. If this is done, this side of the engine hanger will resemble that of the opposite side wherein the head of the pin 20 is accommodated.

Figure 2:
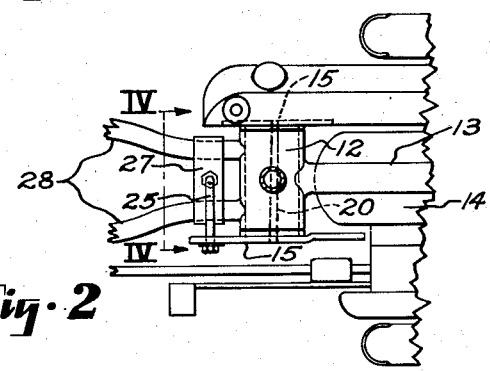
Fig. 2 is a fragmentary plan view taken along line II—II of Fig. 1.
Figure 4:
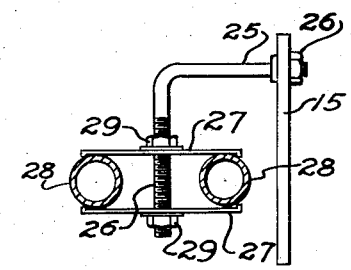
Fig. 4 is a view taken along line IV—IV of Fig. 2 illustrating one form of means for adjusting the angularity of the motor with respect to the frame.

In Fig. 4, and as seen in plan view in Fig. 2, there is shown a means whereby the angular disposition of the motor may be regulated with respect to the frame, thus correctly to align the drive shaft with the rear wheel, gears, etc. Whereas any suitable means for accomplishing this is contemplated, there is illustrated a preferred means which comprises an angular round 25 that is adapted to be fastened as at 26 to some convenient portion of the engine, which in the present case is an extension of one of the bifurcations 15. The opposite end of the angular round is threaded as at 26 and is adapted to project down between plates or washers 27 which are disposed respectively above and below the rear forks 28 of the bicycle frame. Jam nuts 29 are disposed on opposite sides of their respective plates or washers 27 and may be loosened to allow the angular round 25, and hence its associated motor extension, to be raised or lowered, and when finally in correct position, to be tightened to anchor the entire arrangement firmly in position. As finally adjusted the threaded portion of the angular round 25 is obviously under tension and a secure connection is made that will not rattle and will not get out of adjustment.

From the foregoing it is clear that I have provided an engine mounting which may be expeditiously and economically installed in a conventional bicycle without requiring any special fittings or brackets, without encumbering the frame of the bicycle with bulky mass and without changing the center of gravity of the bicycle except in a beneficial way, i. e., to lower it. The pulsations of the engine are absorbed by the use of elastic bushings in the pedal-sprocket housing and ready adjustments and interchangeability are afforded.

I claim as my invention:

1. A mounting for bicycle auxiliary power units comprising a bifurcated engine hanger adapted to straddle the pedal-sprocket housing of a bicycle frame, housing-engaging means arranged between the bifurcations of said hanger including an expansible bushing for such a housing, and means connecting said bifurcations extending through said bushing for expanding the latter in the pedal-sprocket housing.

2. A mounting for bicycle auxiliary power units comprising an engine hanger, pedal-sprocket housing-engaging means associated with said hanger, said means including an expansible bushing, expander plugs disposed in opposed relation within said bushing, a pin extending between said plugs, and means associated with said pin for actuating said plugs to expand and retract said bushing.

3. The invention of claim 2, said plugs being frusto-conical in form, and said bushing having a bore smallest at its center and flaring outwardly at each end to afford complementary bearings for said plugs.

4. The invention of claim 2 in which said bushing is of an elastic material.

5. In combination, a bicycle frame including a pedal sprocket housing, an engine, a crankcase housing for said engine, a pair of extensions on said housing spanning said sprocket housing, a pair of aligned openings in said extensions, a pin projected through said openings, an expandible bushing circumjacent said pin, said bushing and pin being disposed in said sprocket housing, and means for effecting the expansion of said bushing.

6. A motor mounting means for use with a cycle including a bifurcated hanger for connection with a motor, said hanger being adapted to straddle the pedal-sprocket housing of a cycle frame, and means adapted to be disposed within the housing for securing said hanger to the cycle frame.

7. In combination with the pedal support housing of a cycle, of an auxiliary motor mounting for suspending a motor from said housing including a portion extending through the housing and supported therein, and a plate member disposed at each end of the housing for carrying a motor, said plate members being part of a unitary motor supporting hanger, said plate members being supported by said housing supported portion and extending forwardly therefrom.

FRANK STEVENS THOMAS, Jr.

REFERENCES CITED

The following references are of record in the file of this patent:

UNITED STATES PATENTS

| Number | Name | Date |
|---|---|---|
| 675,391 | Keating | June 4, 1901 |
| 2,091,698 | Anthony et al. | Aug. 31, 1937 |
| 2,401,449 | Yates | June 4, 1946 |

FOREIGN PATENTS

| Number | Country | Date |
|---|---|---|
| 10,503 | Great Britain | Oct. 20, 1900 |
| 141,906 | Great Britain | Apr. 29, 1920 |
| 424,458 | Great Britain | Feb. 21, 1935 |
| 487,682 | Great Britain | June 21, 1938 |
| 556,908 | France | Apr. 23, 1923 |